US008479604B2

(12) United States Patent
Jackson

(10) Patent No.: US 8,479,604 B2
(45) Date of Patent: Jul. 9, 2013

(54) POWERTRAIN FOR AN AUTOMOTIVE VEHICLE WITH MULTIPLE-RATIO GEARING AND A DUAL POWER INPUT CLUTCH

(75) Inventor: Graeme A. Jackson, Kalamazoo, MI (US)

(73) Assignee: Eaton Corporation, Cleveland, OH (US)

( * ) Notice: Subject to any disclaimer, the term of this patent is extended or adjusted under 35 U.S.C. 154(b) by 957 days.

(21) Appl. No.: 12/500,774

(22) Filed: Jul. 10, 2009

(65) Prior Publication Data

US 2009/0266199 A1   Oct. 29, 2009

Related U.S. Application Data

(63) Continuation-in-part of application No. 11/702,359, filed on Feb. 5, 2007, now Pat. No. 7,587,957.

(51) Int. Cl.
*F16H 3/08* (2006.01)
*F16H 37/06* (2006.01)

(52) U.S. Cl.
USPC .......................................... 74/340; 74/665 E

(58) Field of Classification Search
USPC .................... 74/330, 331, 329, 340
See application file for complete search history.

(56) References Cited

U.S. PATENT DOCUMENTS

| | | | |
|---|---|---|---|
| 2,379,023 A | 6/1945 | Miller | |
| 4,296,644 A | 10/1981 | Sada et al. | |
| 4,823,628 A * | 4/1989 | Hiraiwa | 74/330 |
| 5,613,401 A | 3/1997 | Maurizio | |
| 5,881,600 A * | 3/1999 | Fan | 74/329 |
| 6,397,994 B1 | 6/2002 | Bowen | |
| 7,204,166 B2 | 4/2007 | Gochenour | |
| 7,267,022 B2 * | 9/2007 | Gumpoltsberger et al. | 74/331 |
| 7,272,987 B2 * | 9/2007 | Hughes | 74/340 |
| 7,469,609 B2 | 12/2008 | Baldwin | |
| 7,841,252 B2 * | 11/2010 | Remmler | 74/330 |
| 2005/0204840 A1 * | 9/2005 | Soeda | 74/330 |
| 2005/0247147 A1 | 11/2005 | Gumpoltsberger et al. | |
| 2006/0048593 A1 | 3/2006 | Gumpoltsberger et al. | |
| 2006/0048594 A1 * | 3/2006 | Gumpoltsberger et al. | 74/331 |
| 2006/0123939 A1 * | 6/2006 | Akutagawa | 74/329 |
| 2006/0150759 A1 * | 7/2006 | Gitt | 74/330 |

(Continued)

FOREIGN PATENT DOCUMENTS

DE       100 37 401 A1     2/2002
DE   10 2007 040 449 A1    3/2009

(Continued)

OTHER PUBLICATIONS

Written Opinion (dated Feb. 7, 2011) from EP 2 273 153, published Mar. 9, 2011, 8 pgs.

(Continued)

*Primary Examiner* — Troy Chambers
*Assistant Examiner* — Jude Agendia
(74) *Attorney, Agent, or Firm* — Brooks Kushman P.C.

(57) ABSTRACT

A multiple-ratio transmission with countershaft gearing with dual power input clutches. Ratio changes are made from each of several ratios to a preselected ratio by alternately engaging and disengaging the power input clutches. A robust bearing arrangement provides high torque transmitting capacity. An optimum number of transmission ratios are available with a minimum number of gear meshes.

19 Claims, 2 Drawing Sheets

U.S. PATENT DOCUMENTS

| | | | |
|---|---|---|---|
| 2007/0022835 A1* | 2/2007 | Kilian et al. | 74/340 |
| 2007/0214904 A1 | 9/2007 | Ohnemus | |
| 2008/0184846 A1 | 8/2008 | Jackson | |
| 2008/0245167 A1 | 10/2008 | Gitt | |

FOREIGN PATENT DOCUMENTS

| | | |
|---|---|---|
| EP | 1 566 569 A1 | 8/2005 |
| FR | 1469727 | 2/1967 |
| JP | 59 140941 A | 8/1984 |
| WO | 2007031193 | 3/2007 |

OTHER PUBLICATIONS

Lifshits et al., Improvement of Continuously Variable Automatic Drives of Automobiles with Preselective Control and Non-Separating Gear Change, Vestnik Mashinostroeniya, vol. 69, No. 5, pp. 5-9, 1989 1323 Soviet Engineering Research 9 (1989) No. 5, New York.

International Search Report for PCT/IB2008/000241 dated Jun. 25, 2008.

* cited by examiner

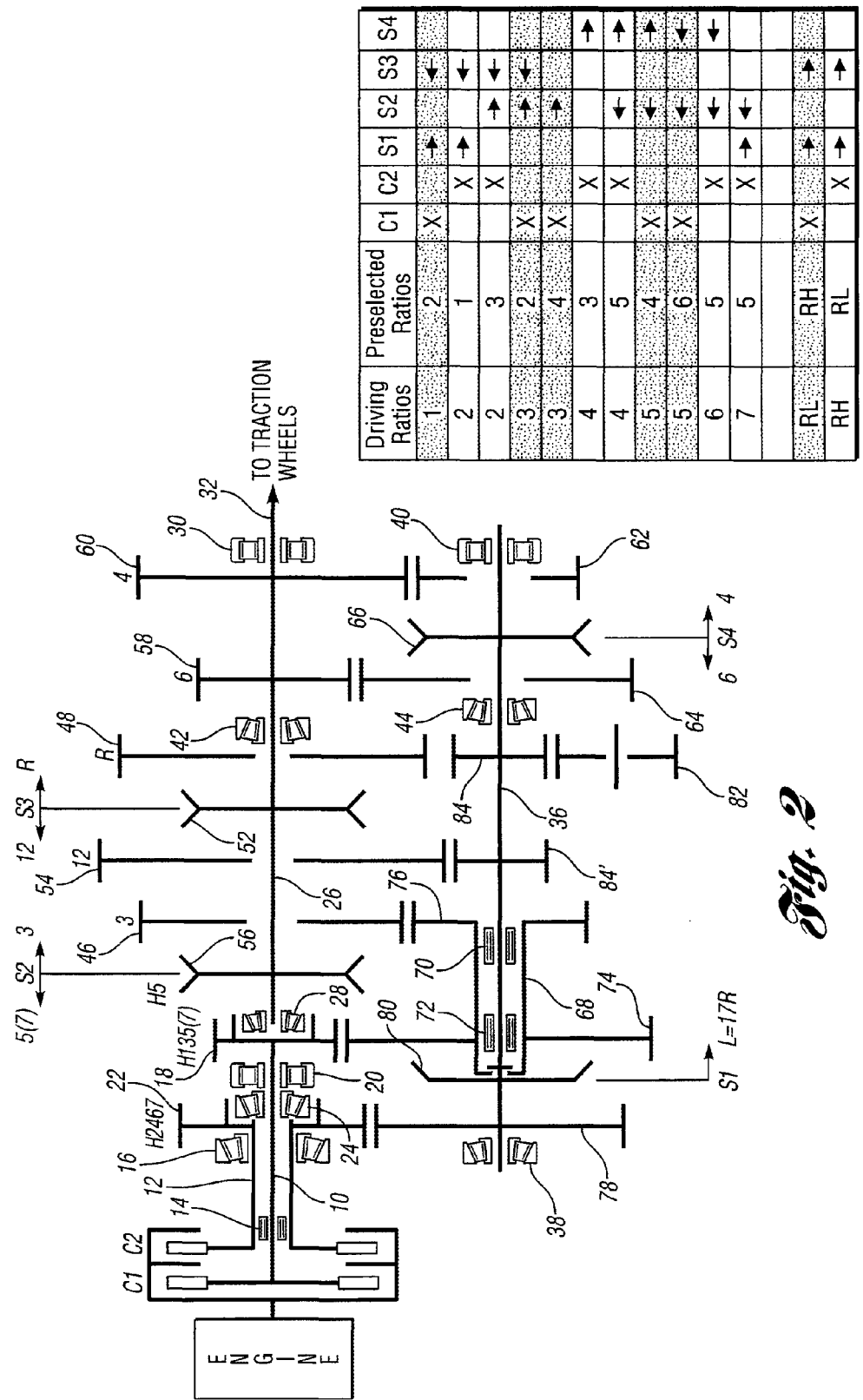

POWERTRAIN FOR AN AUTOMOTIVE VEHICLE WITH MULTIPLE-RATIO GEARING AND A DUAL POWER INPUT CLUTCH

CROSS-REFERENCE TO RELATED APPLICATIONS

This application is a continuation-in-part of U.S. application Ser. No. 11/702,359 filed Feb. 5, 2007, now issued U.S. Pat. No. 7,587,957.

BACKGROUND OF THE INVENTION

1. Field of the Invention

The invention relates to a multiple-ratio power transmission mechanism with a dual power input clutch arrangement and ratio change clutches wherein a ratio is established as an adjacent ratio is preselected during a ratio shift sequence.

2. Background Art

Automotive vehicle transmissions used, for example, in powertrains for heavy-duty or medium-duty trucks usually require a relatively high number of gear ratios in at least one range of ratios so that the speed and torque characteristics of an engine in the powertrain will provide optimal traction wheel power throughout an operating speed range. A transmission of this type is disclosed in co-pending patent application Ser. No. 11/702,359, filed Feb. 5, 2007, which is assigned to the assignee of the present invention. The transmission of the '359 patent application includes countershaft gear elements that mesh with gears mounted on a mainshaft axis. Ratio change clutches selectively connect torque transmitting gears to the mainshaft thereby establishing power delivery paths from the engine to the traction wheels. Ratio change clutches may be mounted also on a countershaft axis to selectively connect gear elements to the countershaft. It is known design practice, as in the case of the transmission disclosed in the co-pending patent application, to include a dual clutch arrangement to establish a power delivery path through the countershaft gear elements and through the mainshaft gears as one or more of the ratio change clutches are engaged. A ratio change clutch not involved in a given selected power flow path can be pre-engaged in preparation for a ratio change to an adjacent ratio. Dual clutches of the dual clutch arrangement are alternately engaged and disengaged to provide a smooth transition from one ratio to an adjacent ratio in a seamless fashion without interruption of torque delivery between the engine and the vehicle traction wheels.

SUMMARY OF THE INVENTION

The invention comprises improvements in known heavy-duty power transmissions with a dual power input clutch arrangement located between a vehicle engine and a multiple-ratio countershaft transmission. The improvements include increased durability and robustness of the transmission so that it is capable of high torque delivery from the engine to the vehicle traction wheels. Unlike multiple-ratio countershaft mechanisms of known design, the mainshaft and the countershaft of the multiple-ratio transmission of the present invention include a shorter bearing span for the mainshaft and for the countershaft so that bearing loads are better accommodated during torque delivery from the engine to the vehicle traction wheels. Increased robustness and durability is accomplished also by providing improved bearing supports for the power input shaft and the dual clutch arrangement for the multiple-ratio gearing.

As in the case of the transmission disclosed in the above-mentioned co-pending patent application, the transmission mechanism of the present invention includes a countershaft arrangement of reduced length in which a first countershaft is concentrically mounted with respect to a second countershaft on a common countershaft axis. This arrangement eliminates the need for an elongated countershaft.

The first countershaft is concentrically mounted on its companion countershaft. It carries two countershaft gear elements that may have similar helical gear tooth leads. The load on the concentrically mounted countershaft can be accommodated without the need for a roller thrust bearing between the countershafts. Any axial thrust loads that are created by the gear elements on the concentric countershaft can be accommodated by a plain thrust washer or a radial needle bearing.

Ratio changes in the transmission of the present invention can be obtained using a minimum number of gear meshes and a minimum number of ratio change clutches, thereby reducing the overall manufacturing cost of the transmission and reducing substantially the complexity of the gearing arrangement without compromising transmission performance. The ratio change clutches are situated in an optimum fashion to simplify control of ratio shifts using shift forks supported by transmission shift rails. The shift rails may be manually shifted or power shifted.

BRIEF DESCRIPTION OF THE DRAWINGS

FIG. 2 is a schematic diagram of the transmission of FIG. 1 including an illustration of the bearings and bearing locations for the input shaft, the transmission mainshaft and the two concentrically-mounted transmission countershafts; and FIG. 2a is a chart showing a clutch engagement-and-release pattern that is followed during ratio changes in the transmission gearing of FIGS. 1 and 2.

PARTICULAR DESCRIPTION OF THE INVENTION

Figure 1:
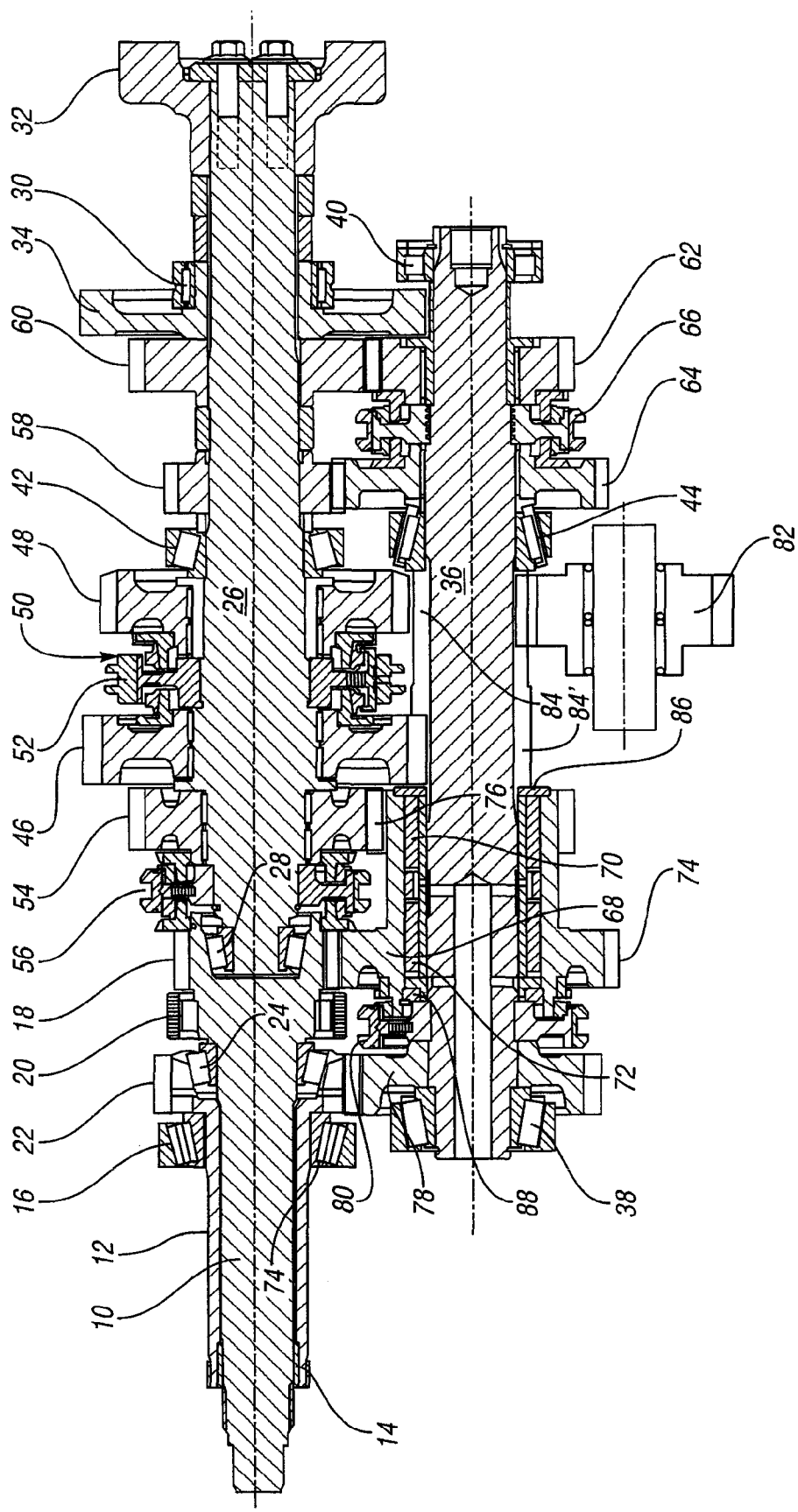
FIG. 1 is a cross-sectional view of a multiple-ratio countershaft transmission that includes the present invention.

The transmission illustrated in FIG. 1 includes a first power input shaft 10 and a second power input shaft 12, which are drivably connected to a vehicle engine through a dual clutch arrangement that will be described with reference to FIG. 2. The power input shaft 12 is journaled by a tapered roller bearing 16 located in a bearing opening in a transmission bearing support wall (not shown). A headset gear 18 is formed on power input shaft 10 at its inboard end. Input shaft 10 is used as a torque input shaft for odd numbered ratios, as will be explained subsequently. Headset gear 18 is journaled by roller bearing 20 within a bearing opening formed in the transmission housing.

Another headset gear 22 is formed on power input sleeve shaft 12. It is journaled by tapered roller bearing 24 on the inboard end of power input shaft 10. Sleeve shaft 12 is used as a torque input shaft for even numbered ratios.

A transmission mainshaft 26 is journaled by tapered roller bearing 28, which is positioned in a bearing pocket at the inboard end of shaft 10. The right-hand end of mainshaft 26 is journaled by straight roller bearing 30 in a rear bearing support wall in the transmission housing. Mainshaft 26 is connected to a traction wheel driveshaft by a universal joint connection partially shown at 32.

A parking gear 34 may be splined to the mainshaft 26 and journaled with the mainshaft by a bearing 30 in the rear bearing support wall of the transmission housing.

A first countershaft 36 is end supported at its left side by tapered roller bearing 38 in a bearing support wall for the transmission. The right-hand end of first countershaft 36 is journaled by straight roller bearing 40 located in a bearing pocket in the rear bearing support wall of the transmission.

A tapered roller bearing 42 rotatably supports mainshaft 26 at a location intermediate bearing 30 and bearing 28. It is situated in a bearing opening in a mid-bearing support wall for the transmission housing. A tapered roller bearing 44 rotatably supports first countershaft 36 at a point intermediate bearings 38 and 40. Tapered roller bearing 44 is located in a bearing pocket in a mid-bearing support wall that is common to bearing opening for bearing 42. The strategic location of the bearing support wall for bearings 42 and 44 makes it possible to provide bearing support for mainshaft 26 and first countershaft 36 at a location that enhances the robustness of the gearing assembly with negligible deflection under gear loads.

A first ratio and second ratio gear 46 is journaled on mainshaft 26. Gear 46 drivably engages countershaft gear element 84', which may have gear teeth that are common to reverse drive gear element 84, which will be described hereinafter. A low reverse ratio and a high reverse ratio gear 48 also is journaled on mainshaft 26. A ratio change synchronizer clutch assembly 50 is located between mainshaft gears 46 and 48.

Synchronizer clutch assembly 50 may be of a design well known in the transmission art. It includes a synchronizer clutch sleeve 52, which can be shifted in a left-hand direction and in a right-hand direction to connect selectively mainshaft gear 46 to mainshaft 26 and mainshaft gear 48 to mainshaft 26. Sleeve 52, when it is shifted in a right-hand direction, engages a cone clutch element, which causes a blocker ring to block shifting movement of the sleeve 52 into clutch engagement with external clutch teeth on the gear 48 until the speed of gear 48 is in synchronism with respect to the speed of mainshaft 26. The sleeve 52 has three operating positions determined by a spring loaded detent. As shown in FIG. 1, sleeve 52 has a detent position corresponding to its neutral position. Second and third detent positions are established as the sleeve 52 is moved to the left for first or second ratio of operation and to the right for reverse ratio operation.

A third ratio mainshaft gear 54 is journaled on the left end of mainshaft 26. A synchronizer clutch assembly 56 has a sleeve that locks third ratio gear 54 to the mainshaft 26 when it is shifted in a right-hand direction. When the sleeve 56 is shifted in the left-hand direction, power input shaft 10 is connected directly to the left end of mainshaft 26.

A sixth ratio mainshaft gear 58 is splined or otherwise secured to mainshaft 26. A fourth ratio mainshaft gear 60 also is splined or otherwise secured to mainshaft 26. Mainshaft gear 60 is in continuous meshing engagement with countershaft gear element 62.

A synchronizer clutch assembly is located between countershaft gears 62 and 64. It includes a clutch sleeve 66, which drivably engages gear element 62 when it is shifted in a right-hand direction, thereby connecting gear 62 to first countershaft 36. When sleeve 66 is shifted in a left-hand direction, it drivably connects gear element 64 to first countershaft 36 for sixth ratio operation.

The headset gear assembly provides separate power flow paths from input shaft 10 and input sleeve shaft 12 to first countershaft 36 and to a second countershaft sleeve shaft 68, respectively. The countershaft sleeve shaft is journaled on first countershaft 36 by bearings 70 and 72.

A first countershaft gear element 74 and a second countershaft gear element 76 are formed on countershaft sleeve 68. Gear element 74 drivably engages headset gear 18 and countershaft gear element 76 drivably engages mainshaft gear 54. Bearing 70 accommodates bearing loads at the mesh between gear element 76 and mainshaft gear 54. Bearing 72 accommodates bearing loads at the mesh between countershaft gear element 74 and headset gear 18. Countershaft gear element 78 is drivably connected to the left end of first countershaft 36. It meshes with headset gear 22.

A synchronizer clutch assembly is located between countershaft gear element 76 and countershaft gear element 74. It includes a synchronizer clutch sleeve 80 which, when moved in a right-hand direction, drivably connects countershaft gear element 74 to first countershaft 36.

Synchronizer clutch sleeve 80 is shiftable only in a right-hand direction to connect drivably countershaft gear element 74 to first countershaft 36.

Reverse drive gear 48 journaled on mainshaft 26 engages drivably reverse drive pinions 82, which drivably engage reverse drive gear element 84. For clarity, pinions 82 are shown out of position with respect to the plane of the cross section of FIG. 1.

The countershaft gear elements 76 and 74 may have uniform helical tooth leads. The thrust forces created by the gears are accommodated by either axial bushings or bearings 86 and 88.

FIG. 2 is a schematic representation of the transmission gearing and bearing arrangement illustrated in FIG. 1. For purposes of describing the mode of operation of the dual clutch arrangement shown at C1 and C2 and the ratio shifts sequences of the ratio change clutches, reference will be made to FIG. 2a.

Except for the seventh ratio, clutch C1 is engaged for each odd numbered gear ratio. Clutch C2 is engaged for operation of the transmission in each even numbered gear ratio. Clutches C1 and C2 of the dual clutch arrangement connect the engine (seen in FIG. 2) to power input shaft 10 and to power input shaft 12, respectively.

During operation in the first speed ratio, clutch C1 is engaged and synchronizer sleeve 80 is shifted to the right. Synchronizer sleeve 52 is shifted to the left to condition the gearing for second ratio operation. Power flow then occurs from the engine to clutch C1 and input shaft 10 to headset gear 18, through clutch sleeve 80, countershaft gear element 74, countershaft gear element 84', mainshaft gear 54 and mainshaft 26.

To achieve second ratio operation, clutch C1 is disengaged and clutch C2 is engaged. Engine torque then is delivered to headset gear 22. A power flow path in the second ratio then continues through countershaft gear element 78, countershaft gear element 84', mainshaft gear 54 and mainshaft 26. Synchronizer clutch sleeve 80 then can be shifted to the left to disconnect first ratio. Clutch sleeve 56 is shifted to the right to pre-select an updrift to the third ratio.

To condition the transmission for third ratio operation while operating in the second ratio, clutch C2 remains applied and synchronizer sleeve 56 is shifted to the right.

To effect a ratio change to the third ratio from the second ratio, clutch C2 is disengaged, clutch C1 is engaged and clutch sleeve 52 is shifted to neutral. To condition the transmission for an upshift to the fourth ratio from the third ratio, synchronizer clutch sleeve 56 remains shifted to the right and synchronizer clutch sleeve 66 is moved to the right under zero torque. The fourth ratio then is achieved simply by engaging clutch C2 and releasing clutch C1. Synchronizer clutch sleeve 66 remains shifted at this time to the right thereby preselecting the fifth ratio.

An upshift from the fourth ratio to the fifth ratio is achieved by engaging clutch C1 and disengaging clutch C2. Synchronizer clutch sleeve 66 remains shifted to the right so that the gearing is preconditioned for a downshift to the fourth ratio. It is shifted to the left to condition the gearing for an upshift to the sixth ratio. Synchronizer clutch sleeve 56 is shifted to the left for both an upshift and a downshift from the fifth ratio. Clutch sleeve 52 is in a neutral position during operation in fifth ratio as well as when sixth ratio is pre-selected while operating in first ratio.

A ratio change from the fifth ratio to the sixth ratio occurs by disengaging clutch C1 and engaging clutch C2 as synchronizer clutch sleeves 56 and 66 remain shifted to the left.

During a shift to the seventh ratio from the sixth, unlike shifts for the first through sixth ratios, a trading of the engagement of the clutches C1 and C2 does not occur. In this instance, clutch C2 is released and then reapplied as clutch C1 remains released. A downshift from the seventh ratio to the fifth ratio may occur by maintaining synchronizer clutch sleeve 56 shifted to the left and applying clutch C1 and releasing clutch C2 while synchronizer clutch sleeve 80 remains shifted to the right.

The transmission mechanism has a high reverse ratio and a low reverse ratio. During operation in the high reverse ratio, clutch C1 is engaged and clutch C2 is disengaged. During operation in the low reverse ratio, clutch C1 is disengaged and clutch C2 is engaged. In both reverse ratios, synchronizer clutch sleeve 80 is shifted into engagement with countershaft gear element 74. Also, synchronizer clutch sleeve 52 is shifted into engagement with reverse gear 48.

The improved gearing arrangement of the present invention, like the gearing arrangement of co-pending application Ser. No. 11/702,359, makes it possible to achieve an additional gear ratio (i.e., the seventh ratio) without the need for providing an added gear mesh and additional gear elements. This is achieved by using one of the headset gears, i.e., headset gear 18, as a torque delivery gear during seventh ratio operation. Torque delivery during seventh ratio operation is through a torque delivery path including clutch C2, headset gear 22, countershaft gear element 78, clutch sleeve 80, countershaft gear element 74, headset gear 18 and mainshaft 26.

The robustness of the gearing arrangement is improved by providing an additional bearing support for the torque input shafts. This bearing support, which is shown at 20, complements the function of the tapered roller bearings 28, 24 and 16. The positioning of the bearing 20 in the region of the headset gearing is accomplished without adding axial length to the overall gearing assembly.

The additional robustness provided by the gearing arrangement of the present invention is achieved by adding bearings 44, 42, and 20, which have no counterparts in the gearing arrangement disclosed in application Ser. No. 11/702,359, previously identified, and gearing arrangements of known design. This bearing arrangement makes it possible to provide shorter shaft lengths between bearing supports. The gearing arrangement of the present invention, furthermore, does not require cantilever supported gearing since the bearing supports are on the outboard side of the gearing arrangement.

As in the case of co-pending patent application Ser. No. 11/702,359, the present invention uses a dual countershaft arrangement wherein one countershaft is concentrically disposed about the other. This reduces the overall length of the gearing assembly. Further, the countershaft elements are capable of being locked together by the single acting, stand-alone, synchronizer clutch. The synchronizer clutch sleeve for this clutch is shown at 80 in FIG. 2.

The locations of the synchronizer clutches are strategically positioned within the gearing arrangement of the present invention so that shifting of the synchronizer clutch sleeves using known ratio shift forks carried by shift rails is simplified and more efficient. The shift rails can be actuated, either manually or by a power shift mechanism.

Although an embodiment of the present invention has been disclosed, it will be apparent to persons skilled in the transmission art that modifications may be made without departing from the scope of the invention. All such modifications and improvements therein are intended to be covered by the following claims.

What is claimed is:

1. A multiple-ratio power transmission for an engine-powered vehicle comprising:
    a mainshaft in a transmission housing connected drivably to a power output shaft;
    a first countershaft disposed parallel to the mainshaft and a second countershaft mounted concentrically about the first countershaft;
    first and second power input shafts, the first power input shaft being mounted concentrically about the second power input shaft;
    a headset gear assembly including:
        first and second headset gears connected drivably to the first and second power input shafts, respectively;
        a first headset bearing rotatably supporting the second power input shaft and the second headset gear on the housing;
        a second headset bearing rotatably supporting the first power input shaft on the housing; and
        a third headset bearing intermediate the first and second headset bearings rotatably supporting the first power input shaft on the second power input shaft, whereby headset gearing loads are accommodated;
    mainshaft gears in meshing engagement with countershaft gears to establish torque flow paths between the mainshaft and the power input shafts;
    the first headset gear being in meshing engagement with a countershaft gear for the first countershaft;
    the second headset gear being in meshing engagement with a countershaft gear for the second countershaft;
    a dual clutch assembly for alternately establishing and disestablishing a torque flow path from an engine to the first and second headset gears;
    first and second mainshaft bearings for end supporting the mainshaft within the housing; and
    a third mainshaft bearing disposed intermediate the first and second mainshaft bearings whereby the load capacity of mainshaft gears is improved.

2. The transmission set forth in claim 1 wherein the concentrically mounted power input shafts are journaled together at their respective outboard ends whereby the first and second power input shafts are end supported.

3. The transmission set forth in claim 1 wherein at least one mainshaft gear is connected directly to the mainshaft, a ratio change mainshaft clutch connecting another mainshaft gear to the mainshaft.

4. The transmission set forth in claim 1 wherein the first headset bearing is located within a bearing opening formed within the housing, and
    wherein the second headset bearing is a tapered roller bearing and is located in a bearing opening in a transmission bearing support wall, and wherein the third headset bearing is a tapered roller bearing is located within a bearing opening formed in the transmission housing.

5. The transmission set forth in claim 1 wherein the mainshaft bearing is disposed in a rear bearing support wall in the transmission housing.

6. A multiple-ratio power transmission for an engine-powered vehicle comprising:
a mainshaft in a transmission housing connected drivably to a power output shaft;
a first countershaft disposed parallel to the mainshaft and a second countershaft being a sleeve shaft mounted concentrically about the first countershaft;
first and second power input shafts, the first power input shaft being mounted concentrically about the second power input shaft;
a headset gear assembly including first and second headset gears connected drivably to the first and second power input shafts, respectively;
mainshaft gears in meshing engagement with countershaft gears to establish torque flow paths between the mainshaft and the power input shafts;
the first headset gear being in meshing engagement with a countershaft gear for the first countershaft;
the second headset gear being in meshing engagement with a countershaft gear for the second countershaft;
a dual clutch assembly for alternately establishing and disestablishing a torque flow path from an engine to the first and second headset gears;
a first countershaft bearing for supporting the first countershaft at a first distal end within the housing;
a second countershaft bearing for journaling a second distal end of first countershaft; and
a third countershaft bearing for rotatably supporting the first countershaft at a location disposed intermediate the first and second countershaft bearings whereby the countershaft gear load capacity is improved,
wherein the headset gear assembly includes a first headset bearing rotatably supporting the second power input shaft and the second headset gear in the housing, a second headset bearing rotatably supporting the first power input shaft on the housing, and a third headset bearing rotatably supporting the first power input shaft on the second power input shaft, whereby headset gearing loads are accommodated.

7. The transmission set forth in claim 6 wherein at least one countershaft gear is connected directly to the first countershaft, and a ratio change countershaft clutch for connecting another countershaft gear to the first countershaft.

8. The transmission set forth in claim 7 wherein the ratio change countershaft clutch, when engaged, connects together the first and second countershafts as at least one overall transmission ratio is established.

9. The transmission set forth in claim 8 wherein two countershaft gears are connected directly to the second countershaft, one of the two countershaft gears drivably engaging the second headset gear, the other of the two countershaft gears for the second countershaft drivably engaging a mainshaft gear.

10. The transmission set forth in claim 7 wherein the ratio change countershaft clutch drivably locks together, when engaged, the first and second countershafts.

11. A multiple-ratio power transmission for an engine-powered vehicle comprising:
a mainshaft in a transmission housing connected drivably to a power output shaft;
a first countershaft disposed parallel to the mainshaft;
a second countershaft mounted concentrically about the first countershaft;
first and second power input shafts, the first power input shaft being mounted concentrically about the second power input shaft;
a headset gear assembly including first and second headset gears connected drivably to the first and second power input shafts, respectively;
mainshaft gears in meshing engagement with countershaft gears to establish torque flow paths between the mainshaft and the power input shafts;
the first headset gear being in meshing engagement with a countershaft gear for the first countershaft;
the second headset gear being in meshing engagement with a countershaft gear for the second countershaft;
a dual clutch assembly for alternately establishing and disestablishing a torque flow path from an engine to the first and second headset gears;
wherein the first power input shaft is journaled by a first tapered roller bearing,
wherein the second headset gear is formed on the second power input shaft at an inboard end and is journaled by a first headset bearing,
wherein the first headset gear is formed on the first power input shaft and is journaled by a second tapered roller bearing on the inboard end of the second power input shaft,
wherein the mainshaft is journaled by a third tapered roller bearing;
wherein a distal end of the mainshaft is journaled by a mainshaft bearing, and
wherein a fourth tapered roller bearing rotatably supports the mainshaft at a location intermediate the mainshaft bearing and the third tapered roller bearing.

12. The transmission set forth in claim 11 wherein the first tapered roller bearing is located in a bearing opening in a transmission bearing support wall, and
wherein the second headset gear is formed on the second power input shaft at an inboard end and is journaled by the second tapered roller bearing is located within a bearing opening formed in the transmission housing, and
wherein the mainshaft bearing is disposed in a rear bearing support wall in the transmission housing.

13. A multiple-ratio power transmission for an engine-powered vehicle comprising:
a mainshaft in a transmission housing connected drivably to a power output shaft;
a first countershaft disposed parallel to the mainshaft and a second countershaft being a sleeve shaft mounted concentrically about the first countershaft;
first and second power input shafts, the first power input shaft being mounted concentrically about the second power input shaft;
a headset gear assembly including first and second headset gears connected drivably to the first and second power input shafts, respectively;
mainshaft gears in meshing engagement with countershaft gears to establish torque flow paths between the mainshaft and the power input shafts;
the first headset gear being in meshing engagement with a countershaft gear for the first countershaft;
the second headset gear being in meshing engagement with a countershaft gear for the second countershaft;
a dual clutch assembly for alternately establishing and disestablishing a torque flow path from an engine to the first and second headset gears;

a first countershaft bearing for supporting the first countershaft at a first distal end within the housing;

a second countershaft bearing for journaling a second distal end of first countershaft; and a third countershaft bearing for rotatably supporting the first countershaft at a location disposed intermediate the first and second countershaft bearings whereby the countershaft gear load capacity is improved wherein first and second ratio change clutches for countershaft gears are located adjacent opposite ends of the first countershaft and first and second ratio change clutches for the mainshaft are located intermediate axial locations of the first and second ratio change clutches for the first countershaft whereby the ratio change clutches are situated at optimum locations for effecting a simplified ratio change clutch control.

14. The transmission set forth in claim 13 wherein the gears for the mainshaft and for the first countershaft include a reverse gear near an axial mid-position between ends of the first countershaft whereby transmission ratio control and gearing assembly are simplified.

15. The transmission set forth in claim 13 wherein a thrust bearing is located between the first and second countershafts to accommodate axial thrust forces created by countershaft gear engagements with mainshaft and headset gears.

16. The transmission set forth in claim 15 wherein the mounting for the second countershaft comprises axially spaced bearings for accommodating radial loads on the countershaft gears for the second countershaft.

17. A multiple-ratio power transmission for an engine-powered vehicle comprising:

a mainshaft in a transmission housing connected drivable to a power output shaft;

a first countershaft disposed parallel to the mainshaft and a second countershaft being a sleeve shaft mounted concentrically about the first countershaft;

first and second power input shafts, the first power input shaft being mounted concentrically about the second power input shaft;

a headset gear assembly including first and second headset gears connected drivably to the first and second power input shafts, respectively;

mainshaft gears in meshing engagement with countershaft gears to establish torque flow paths between the mainshaft and the power input shafts;

the first headset gear being in meshing engagement with a countershaft gear for the first countershaft;

the second headset gear being in meshing engagement with a countershaft gear for the second countershaft;

a dual clutch assembly for alternately establishing and disestablishing a torque flow path from an engine to the first and second headset gears;

a first countershaft bearing for supporting the first countershaft at a first distal end within the housing;

a second countershaft bearing for journaling a second distal end of first countershaft;

a third countershaft bearing for rotatable supporting the first countershaft at a location disposed intermediate the first and second countershaft bearings whereby the countershaft gear load capacity is improved; and first and second mainshaft bearings for end supporting the mainshaft within the housing, and a third mainshaft bearing disposed intermediate the first and second mainshaft bearings wherein the third countershaft and the third mainshaft bearing are both located in a common mid-bearing support wall.

18. The transmission set forth in claim 17 wherein the first countershaft bearing is a tapered roller bearing disposed in a bearing support wall for the transmission.

19. The transmission set forth in claim 17 wherein the second countershaft bearing is a straight roller bearing located in a bearing pocket in the rear bearing support wall of the transmission.

\* \* \* \* \*